(12) United States Patent
Sugiyama (10) Patent No.: US 12,518,625 B2
(45) Date of Patent: Jan. 6, 2026

(54) INFORMATION PROCESSING APPARATUS

(71) Applicant: TOYOTA JIDOSHA KABUSHIKI KAISHA, Toyota (JP)

(72) Inventor: Minako Sugiyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 18/544,717

(22) Filed: Dec. 19, 2023

(65) Prior Publication Data

US 2024/0212493 A1      Jun. 27, 2024

(30) Foreign Application Priority Data

Dec. 23, 2022   (JP) .................... 2022-206351

(51) Int. Cl.
*G08G 1/0965* (2006.01)
*G06T 7/70* (2017.01)
*G06V 20/58* (2022.01)

(52) U.S. Cl.
CPC ............ *G08G 1/0965* (2013.01); *G06T 7/70* (2017.01); *G06V 20/58* (2022.01); *G06T 2207/30261* (2013.01)

(58) Field of Classification Search
None
See application file for complete search history.

(56) References Cited

U.S. PATENT DOCUMENTS

| 2021/0122364 A1* | 4/2021 | Lee ................... G06F 18/214 |
| 2021/0231441 A1* | 7/2021 | Fortmann ............. G01C 21/30 |
| 2021/0397187 A1* | 12/2021 | Korjus ............... G05D 1/0282 |
| 2024/0010231 A1* | 1/2024 | Han ................... G01C 21/3415 |
| 2024/0247937 A1* | 7/2024 | Padiri ................. B62D 15/029 |

FOREIGN PATENT DOCUMENTS

| JP | 2005-202693 A | 7/2005 |
| JP | 2015-090611 A | 5/2015 |
| JP | 2022-112572 A | 8/2022 |

* cited by examiner

*Primary Examiner* — Lail A Kleinman
(74) *Attorney, Agent, or Firm* — Dinsmore & Shohl LLP

(57) ABSTRACT

The information processing apparatus according to the present disclosure is mounted on a first vehicle that performs communication by V2X. In the information processing apparatus according to the present disclosure, the controller receives first information including information regarding a location and a type of the first object. The controller sets a range of a first area corresponding to the first vehicle based on the information regarding the type of the first object. When it is determined that the first object is located in the first area based on the information regarding the location of the first object, the controller outputs a second information for urging attention to the first object from an output device mounted on the first vehicle.

6 Claims, 6 Drawing Sheets

INFORMATION PROCESSING APPARATUS

CROSS REFERENCE TO THE RELATED APPLICATION

This application claims the benefit of Japanese Patent Application No. 2022-206351, filed on Dec. 23, 2022, which is hereby incorporated by reference herein in its entirety.

BACKGROUND

Technical Field

The present disclosure relates to an information processing apparatus.

Description of the Related Art

A navigation system is known that obtains location information of an obstacle and a passable width of a road on which the obstacle is located, and provides route guidance to an occupant based on the obtained information (for example, see Patent Literature 1 in the citation list below).

CITATION LIST

Patent Literature

Patent Literature 1: Japanese Patent Application Laid-Open No. 2022-112572

SUMMARY

An object of the present disclosure is to provide a technology capable of more appropriately performing notification regarding driving assistance using V2X.

The present disclosure can be regarded as an information processing apparatus mounted on a first vehicle that performs vehicle-to-everything (V2X) communication. For example, the information processing apparatus may comprise a controller including at least one processor, and the controller is configured to execute processing of:
 receiving a first information including an information regarding a location and a type of a first object;
 setting a first area corresponding to the first vehicle based on the information regarding the type of the first object; and
 outputting a second information for prompting attention to the first object through an output device mounted on the first vehicle, when it is determined that the first object is located in the first area based on the information regarding the location of the first object.

The present disclosure can also be regarded as an information processing method in which a computer mounted on the first vehicle executes the processing of the information processing apparatus. Further, the present disclosure can also be regarded as a program for causing a computer mounted on the first vehicle to execute the information processing method described above, or as a non-transitory storage medium for storing the program.

According to the present disclosure, it is possible to provide a technology capable of more appropriately performing notification regarding driving assistance using V2X.

DESCRIPTION OF THE EMBODIMENTS

In an information processing apparatus according to the present disclosure, the controller receives a first information. The information processing apparatus according to the present disclosure is a computer mounted on a connected vehicle (first vehicle) that performs communication by V2X. The controller according to the present disclosure is, for example, a processor of a computer. The first information according to the present disclosure includes information regarding the location and type of the first object. The type of the first object according to the present disclosure includes, for example, an obstacle, an emergency vehicle, and the like. The obstacle referred to here includes, for example, an accident vehicle, a vehicle that has decelerated suddenly, a work vehicle, a faulty vehicle, a falling object, and the like. The first information is transmitted by broadcast from, for example, an on-vehicle apparatus of a vehicle corresponding to the first object, an on-vehicle apparatus of a vehicle traveling in the vicinity of the first object, a roadside equipment installed in the vicinity of the first object, and the like.

Here, the communication range by V2X is, for example, a range from a radius of several hundred meters to several kilometers centered on a connected vehicle. Therefore, the controller of the information processing apparatus may receive first information from another vehicle, a roadside equipment, and the like located within a radius of several hundred meters to several kilometers centered on the first vehicle.

Here, it is highly necessary to alert the driver of the first vehicle regarding obstacles located on the traveling direction side (around the route) of the first vehicle. In contrast, it is lowly necessary to alert the driver of the first vehicle to obstacles located on the opposite side (rear side) of the traveling direction of the first vehicle and an obstacle located at a point far away from the path of the first vehicle.

It is highly necessary to alert the driver of the first vehicle regarding the emergency vehicle located in a direction other than the traveling direction of the first vehicle, such as when the emergency vehicle approaches from behind the first vehicle, when the emergency vehicle is traveling on a road intersecting the road on which the first vehicle is scheduled to travel, and when the emergency vehicle approaches from in front of the first vehicle.

Accordingly, depending on the location and type of the first object, it is necessary to take measures to determine the necessity of alerting.

Therefore, in the information processing apparatus according to the present disclosure, when the controller receives the first information including the information regarding the location and the type of the first object, the controller sets the range of a first area based on the information regarding the type of the first object. For example, when the type of the first object is an obstacle, the controller may set the first area so as to extend toward the traveling direction side of the first vehicle. At that time, when the obstacle corresponds to the first obstacle, the range of the first area may be set larger than when the obstacle corresponds to the second obstacle. The obstacle corresponding to the first obstacle include obstacles that are assumed to require attention not only to the obstacle itself but also to the surroundings of the obstacle. The obstacle corresponding to the first obstacle is, for example, an accident vehicle in which parts may be scattered around the vehicle, and a bus stopped at a bus stop where passengers may jump out to the road from around the vehicle. Further, the obstacle corresponding to the second obstacle includes an obstacle that is assumed to be sufficient if attention is paid to the obstacle itself. The obstacle corresponding to the second obstacle is, for example, a faulty vehicle, a work vehicle, a falling object, and a vehicle that has decelerated suddenly. Further, when the type of the first object is an emergency vehicle, the controller may set the first area so as to extend in all directions from the first vehicle in a plan view.

When the range of the first area is set as described above, the controller according to the present disclosure determines whether the first object is located within the first area based on the information regarding the location of the first object. When it is determined that the first object is located in the first area, the controller outputs a second information for prompting attention to the first object through an output device mounted on the first vehicle. The output device is, for example, a display of a navigation system mounted on the first vehicle, a MID (Multi Information Display) mounted on the first vehicle, a speaker mounted on the first vehicle, or the like. The controller may display a character, a figure, or the like indicating the second information on the display of the navigation system or MID, or may output a sound indicating the second information from the speaker. When it is determined that the first object is not located in the first area, the controller does not output the second information.

According to the information processing apparatus of the present disclosure, a range of the first object area is set according to the type of the first object. Further, according to the information processing apparatus of the present disclosure, the second information is output only for the first object located in the first area. As a result, it is possible to output the second information only for the first object having a high need for alerting. Therefore, it is possible to alert the driver of the first vehicle more appropriately.

Hereinafter, specific embodiments of the present disclosure will be described with reference to drawings. The hardware configuration, module configuration, functional configuration, etc. described in the following embodiments are not intended to limit the technical scope of the present disclosure to those only them, unless otherwise stated.

Embodiment

In the present embodiment, an example in which the information processing apparatus according to the present disclosure is applied to a system for executing driving assistance for a connected vehicle using V2X will be described.
(General Configuration of System)

Figure 1:
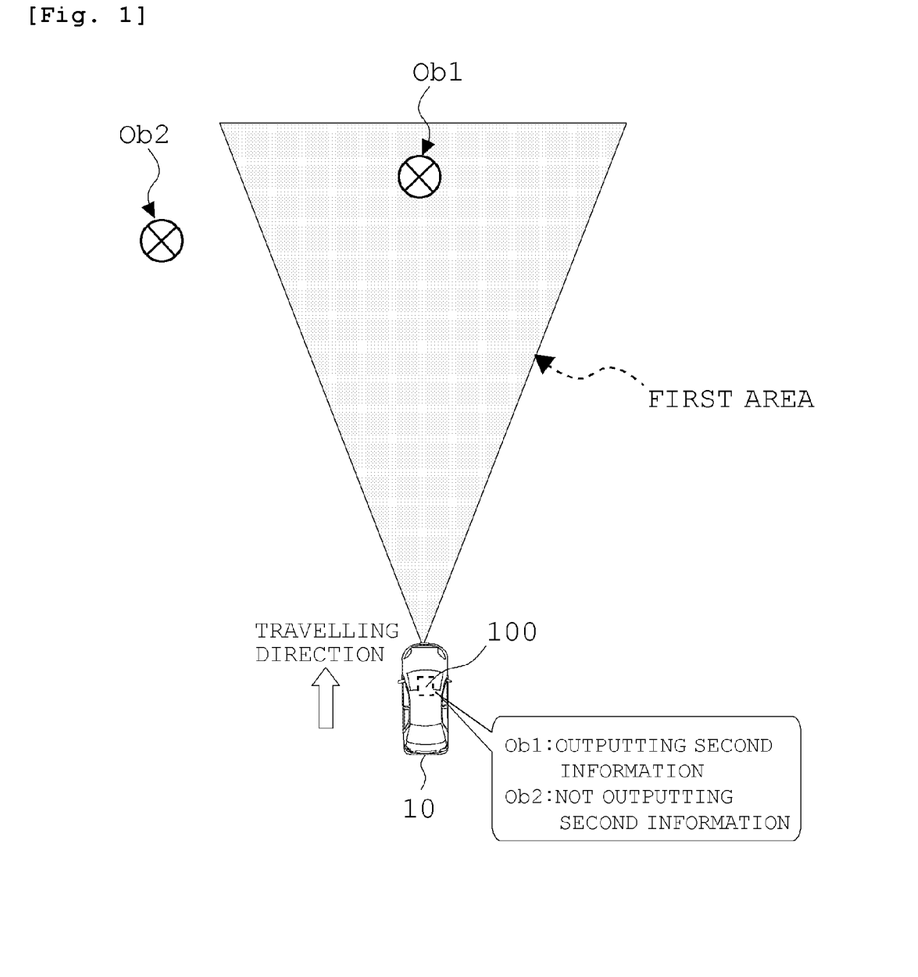
FIG. 1 is a diagram illustrating an outline of a system according to an embodiment.

FIG. 1 is a diagram illustrating an outline of the system according to the present embodiment. The system according to the present embodiment includes a first vehicle 10 and an on-vehicle apparatus 100. The first vehicle 10 is a connected vehicle driven by a user who is a target of driving assistance. The on-vehicle apparatus 100 is a computer mounted on the first vehicle 10, and is an example of an "information processing apparatus" according to the present disclosure.

The on-vehicle apparatus 100 receives a first information using the V2X. The first information in the present embodiment is information regarding a first object existing on a road. The first object in the present embodiment includes an obstacle, an emergency vehicle, and the like. The obstacles in the present embodiment include an accident vehicle (airbag deployment vehicle), a faulty vehicle, a work vehicle, a vehicle that has suddenly decelerated, and a falling object. The emergency vehicle in the present embodiment includes a police vehicle that is traveling in an emergency, an ambulance vehicle that is traveling in an emergency, a fire-fighting vehicle that is traveling in an emergency, and the like.

The "first information" in the present embodiment is an information including at least a location information of first object and an information regarding a type of the first object. Such first information is transmitted by broadcasting from an on-vehicle apparatus of a vehicle different from the first vehicle 10, a roadside equipment, or the like. The vehicle different from the first vehicle 10 includes, for example, a vehicle corresponding to the first object and a vehicle that detects the first object.

When the on-vehicle apparatus 100 receives the first information, the on-vehicle apparatus 100 determines whether the first object is located within the first area based on the location information included in the first information. The first area is a virtual area set according to the type of the first object. The setting method of the first area will be described later. When it is determined that the first object is located in the first area (for example, the obstacle Ob1 in FIG. 1), the on-vehicle apparatus 100 notifies the driver (user) of the first vehicle 10 of the information (second information) for prompting attention to the first object. Further, when it is determined that the first object is not located in the first area (for example, the obstacle Ob2 in FIG. 1), the on-vehicle apparatus 100 does not notify the user of the first vehicle 10 of the information (second information) for prompting attention to the first object.
(Hardware Configuration of On-vehicle Apparatus)

Figure 2:
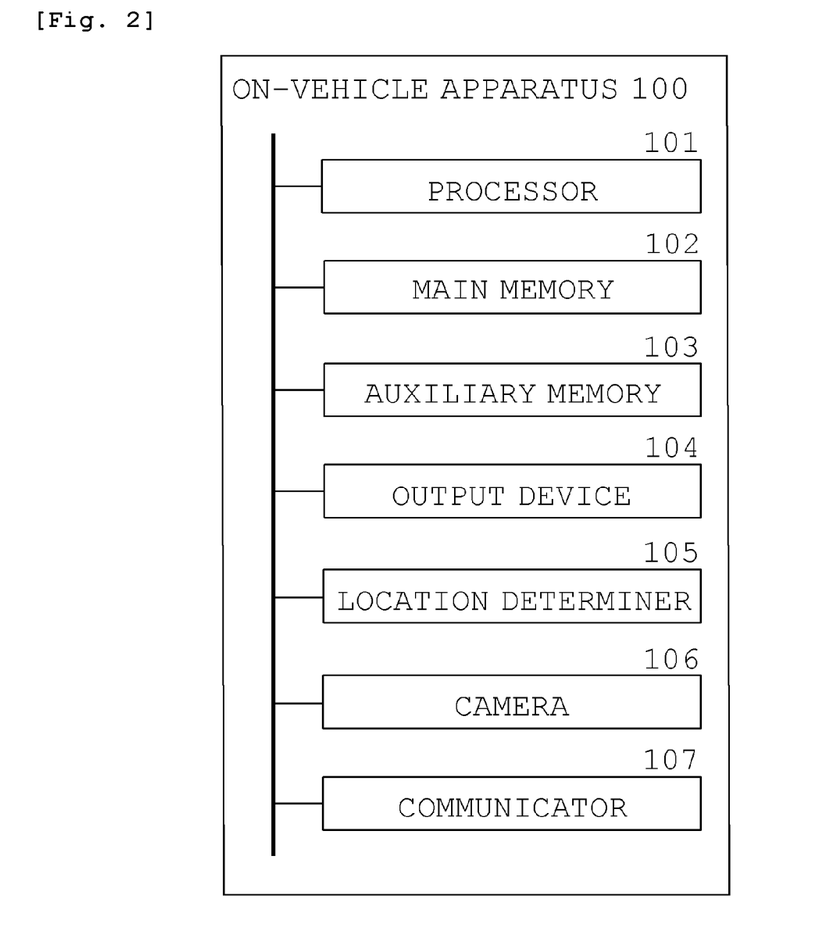
FIG. 2 is a diagram illustrating an example of a hardware configuration of an on-vehicle apparatus according to the embodiment.

FIG. 2 is a diagram illustrating an example of the hardware configuration of the on-vehicle apparatus 100 according to the embodiment. As illustrated in FIG. 2, the on-vehicle apparatus 100 according to the embodiment includes a processor 101, a main memory 102, an auxiliary memory 103, an output device 104, a location determiner 105, a camera 106, and a communicator 107. While FIG. 2 illustrates only hardware components that are related to driving assistance using V2X, the on-vehicle apparatus 100 may also include other hardware components.

The processor 101 is an arithmetic processing unit such as a CPU (Central Processing Unit) or a DSP (Digital Signal Processor). The processor 101 loads programs stored in the auxiliary memory 103 into the main memory 102 and executes them to control the on-vehicle apparatus 100.

The main memory 102 includes a semiconductor memory, such as a RAM (Random Access Memory) and a ROM (Read Only Memory). The main memory 102 provides a storage area and a work area into which programs stored in the auxiliary memory 103 are loaded. The main memory 102 is also used as a buffer for the arithmetic processing executed by the processor 101.

The auxiliary memory 103 includes, for example, an EPROM (Erasable Programmable ROM) or an HDD (Hard Disk Drive). The auxiliary memory 103 may include a removable medium or a portable recording medium. Examples of the removable medium include a USB (Universal Serial Bus) memory and a disc recording medium, such as a CD (Compact Disc) or a DVD (Digital Versatile Disc). The auxiliary memory 103 stores various programs and data that the processor 101 uses when executing the programs.

The programs stored in the auxiliary memory 103 include an operating system (OS) and a special application program for causing the processor 101 to execute processing related to driving assistance using V2X.

The output device 104 is a device that presents information to the user of the first vehicle 10. The output device 104 used in the system according to the embodiment includes a display and a speaker. The display may be a dedicated display. Alternatively, the display may be a multi-information display (MID) or a display of a navigation system, with which the first vehicle 10 is equipped.

The location determiner 105 is a device that determines the present location of the first vehicle 10. The location determiner 105 used in the system according to the embodiment determines the present location of the first vehicle 10. For example, the location determiner 105 is a GPS (Global Positioning System) receiver. The location determiner 105 is not limited to a GPS receiver. For example, the location determiner 105 may be a wireless communication circuit that uses a location information service based on Wi-Fi (registered trademark) access points. For example, the location information determined by the location determiner 105 is geographical coordinates, such as the latitude and longitude.

The camera 106 captures images of the surroundings of the first vehicle 10. The camera 106 may be a special camera. Alternatively, the camera 106 may be a camera of a drive recorder or a camera of an advanced safety system.

The communicator 107 is a device used to perform V2X communication. The communicator 107 used in the system according to the embodiment performs V2X communication using short range communication (communication through distances of the order of several hundred meters to several kilometers). For example, the communicator 107 performs V2X communication using wireless communication based on a communication standard such as Bluetooth (registered trademark) Low-Energy (BLE), NFC (Near Field Communication), UWB (Ultra Wideband), DSRC (Dedicated Short Range Communication), or Wi-Fi (registered trademark).

(Functional Configuration of On-Vehicle Apparatus)

Figure 3:
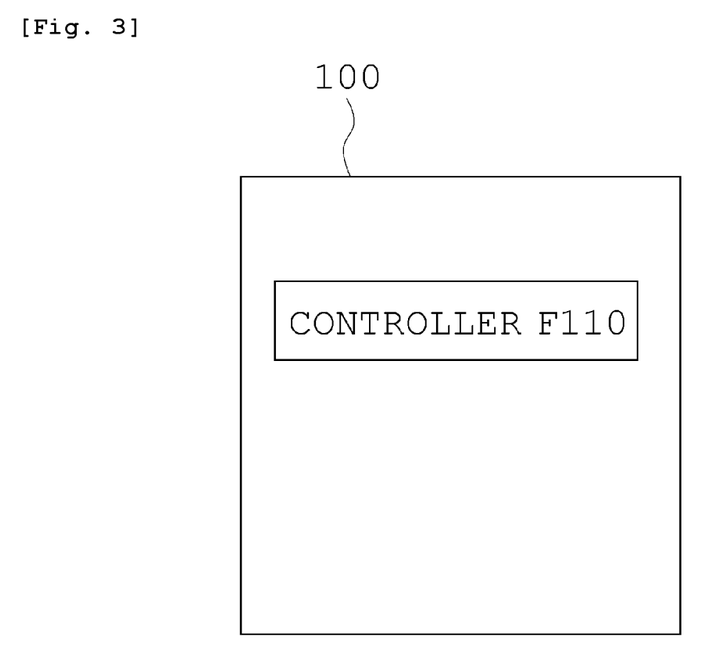
FIG. 3 is a block diagram illustrating an example of the functional configuration of the on-vehicle apparatus according to the embodiment.

The functional configuration of the on-vehicle apparatus 100 according to the embodiment will now be described with reference to FIG. 3. As illustrated in FIG. 3, the on-vehicle apparatus 100 has a controller F110 as its functional component. The functional configuration of the on-vehicle apparatus 100 is not limited to that illustrated in FIG. 3, but some may be added or the controller F110 may be replaced by other functional component.

The controller F110 is implemented by the processor 101 of the on-vehicle apparatus 100 by loading a program stored in the auxiliary memory 103 into the main memory 102 and executing it. Alternatively, the controller F110 may be implemented by a hardware circuit, such as an ASIC (Application Specific Integrated Circuit) or an FPGA (Field Programmable Gate Array).

The controller F110 receives, through the communicator 107, first information transmitted by broadcast from another vehicle or the roadside equipment located within the communication range of the V2X (for example, in a range of a radius of several hundred meters to several kilometers around the first vehicle 10). The first information includes at least the location information of the first object and the information regarding the type of the first object. The location information of the first object is, for example, geographic coordinates such as latitude and longitude of the first object. The information regarding the type of the first object may be an information that identifies the type of the first object, or may be an image data obtained by capturing the first object. When the image data of the first object is used as the information regarding the type of the first object, the controller F110 may specify the type of the first object by executing image recognition processing on the image data.

When the controller F110 receives the first information, the controller F110 sets a range of the first area based on the type of the first object. In the present embodiment, when the type of the first object is an obstacle, the controller F110 sets a virtual area extending toward the traveling direction side of the first vehicle 10 in the geographic coordinate system as the first area. At that time, if the obstacle corresponds to the first obstacle, the controller F110 sets a larger range of the first area than when the obstacle corresponds to the second obstacle.

The "first obstacle" in the present embodiment corresponds to an obstacle that is assumed to require attention to the surroundings of the obstacle in addition to the obstacle itself. The obstacle corresponding to the first obstacle is, for example, an accident vehicle in which parts may be scattered around the vehicle, and a bus stopped at a bus stop in which passengers may jump out to the road from around the vehicle. Further, the "second obstacle" in the present embodiment corresponds to an obstacle that is assumed to be sufficient if attention is paid to the obstacle itself. Obstacles corresponding to the second obstacle are, for example, a faulty vehicle, a work vehicle, a falling object, and a vehicle that has decelerated suddenly.

Figure 4:
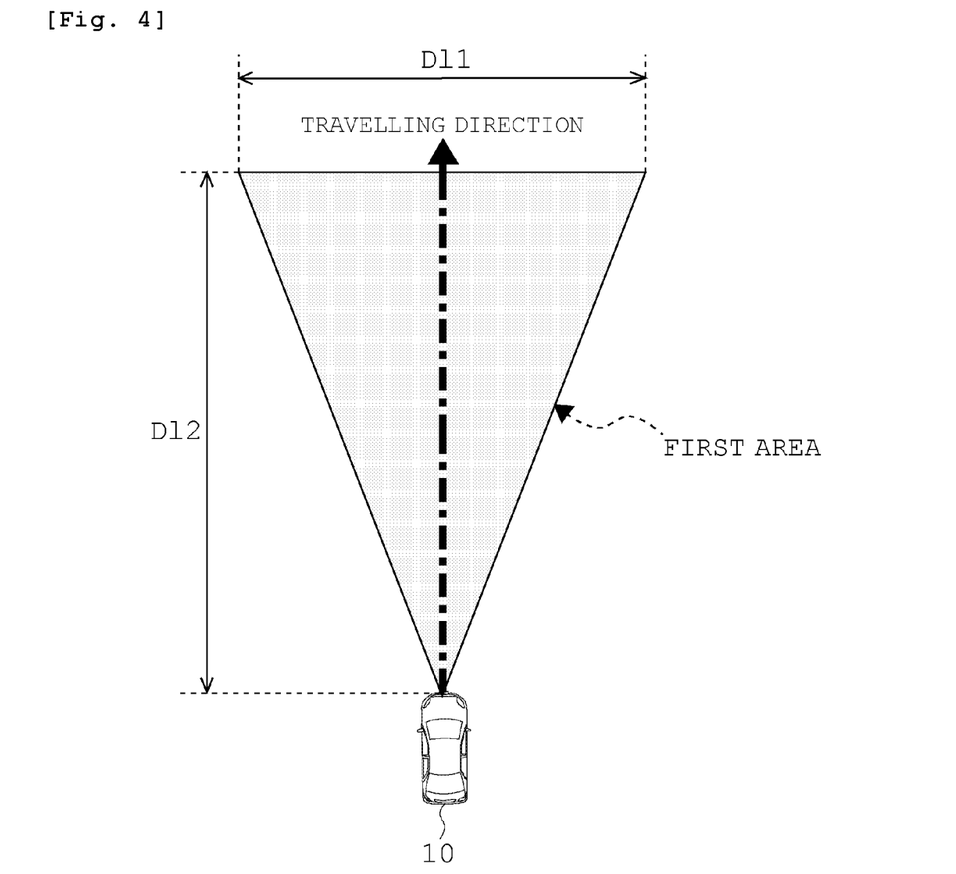
FIG. 4 is a diagram illustrating an example setting the first area when the type of the first object is an obstacle.

An example of how to set the first area when the type of the first object is an obstacle will be described based on FIG. 4. FIG. 4 is a diagram illustrating an example setting the first area when the type of the first object is an obstacle. As illustrated in FIG. 4, the first area when the type of the first object is an obstacle is a substantially inverted triangular area having the position of the first vehicle 10 as the vertex in a plan view. At that time, in the horizontal direction, the first area is set so that the portion corresponding to the base of the inverted triangle shape is orthogonal to the traveling direction of the first vehicle 10. In the first area, the length of the portion corresponding to the base of the inverted triangle shape (hereinafter, sometimes referred to as "first length D11") is set longer when the obstacle corresponds to the first obstacle than when the obstacle corresponds to the second obstacle.

The length from the first vehicle 10 to the portion corresponding to the base of the inverted triangle shape in the traveling direction of the first vehicle 10 (hereinafter, sometimes referred to as "second length D12") may be a fixed value set in advance, or may be a variable value set to a longer value as the traveling speed of the first vehicle 10 increases.

Figure 5:
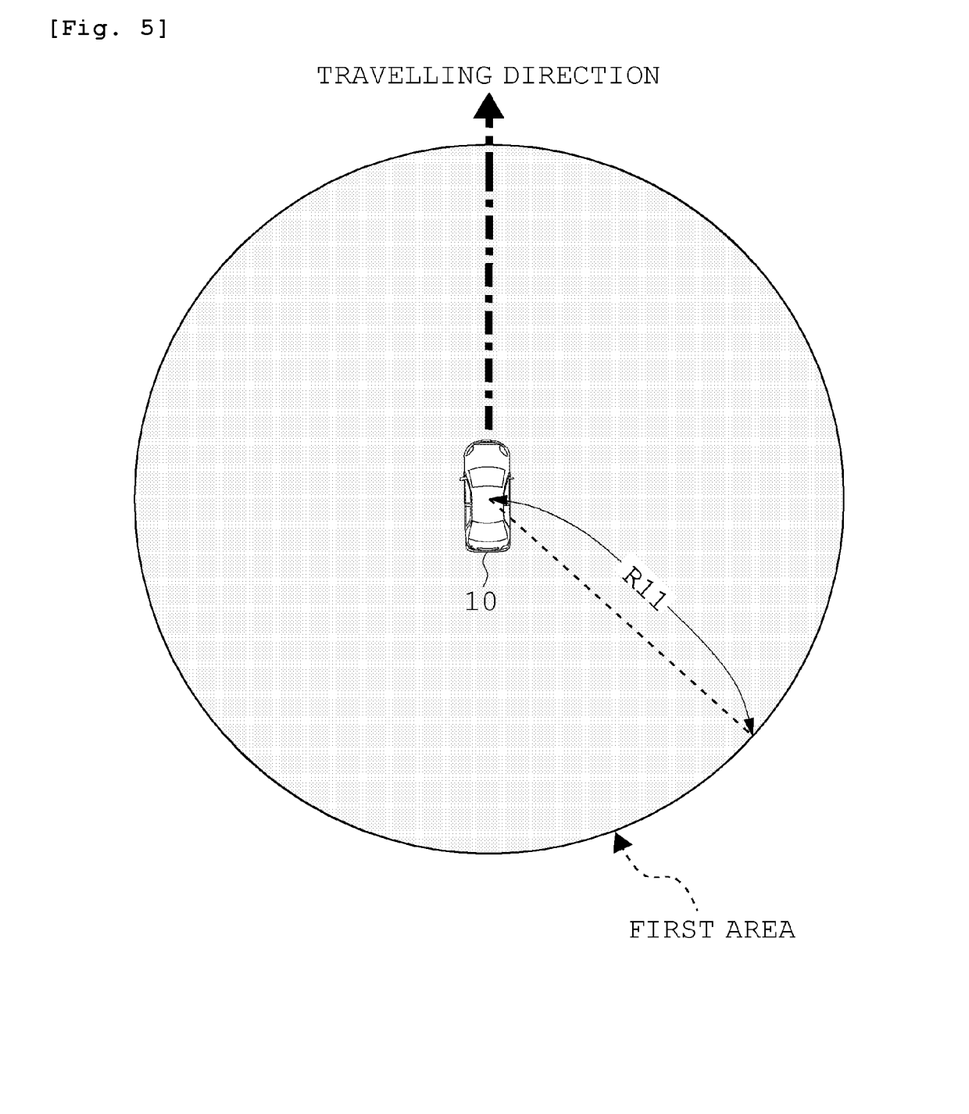
FIG. 5 is a diagram illustrating an example of setting the first area when the type of the first object is an emergency vehicle.

In the present embodiment, when the type of the first object is an emergency vehicle, the controller F110 sets a virtual area extending in all directions from the first vehicle 10 in the geographic coordinate system as the first area. FIG. 5 is a diagram illustrating an example of setting the first area when the type of the first object is the emergency vehicle. As illustrated in FIG. 5, the first area when the type of the first object is the emergency vehicle is a substantially circular area having a radius R11 centered on the position of the first vehicle 10 in plan view. The radius R11 of the first area may be a fixed value set in advance, or may be a variable value that is changed according to the relative position and relative speed of the first vehicle 10 and the emergency vehicle.

When the first area is set as described above, the controller F110 determines whether the first object is located within the first area based on the location information included in the first information. When it is determined that the first object is located within the first area, the controller F110 generates second information about the first object. The second information is an information for urging the user of the first vehicle 10 to alert the first object. The second information includes, for example, an information suggesting a direction in which first object is located, an information for prompting preparation for a driving operation or the like to avoid the first object, and the like. The second information may include an information indicating the type of the first object. The controller F110 outputs the generated second information through the output device 104. At that time, the controller F110 may display a character indicating the second information on the display of the output device 104, or may output a sound indicating the second information from the speaker of the output device 104. When a character indicating the second information is displayed on the display of the output device 104, a notification sound for prompting the user to call attention may be output from the speaker of the output device 104. When it is determined that the obstacle is not located in the first area, the controller F110 does not generate or output the second information regarding the first object.

(Process Performed in On-Vehicle Apparatus)

Figure 6:
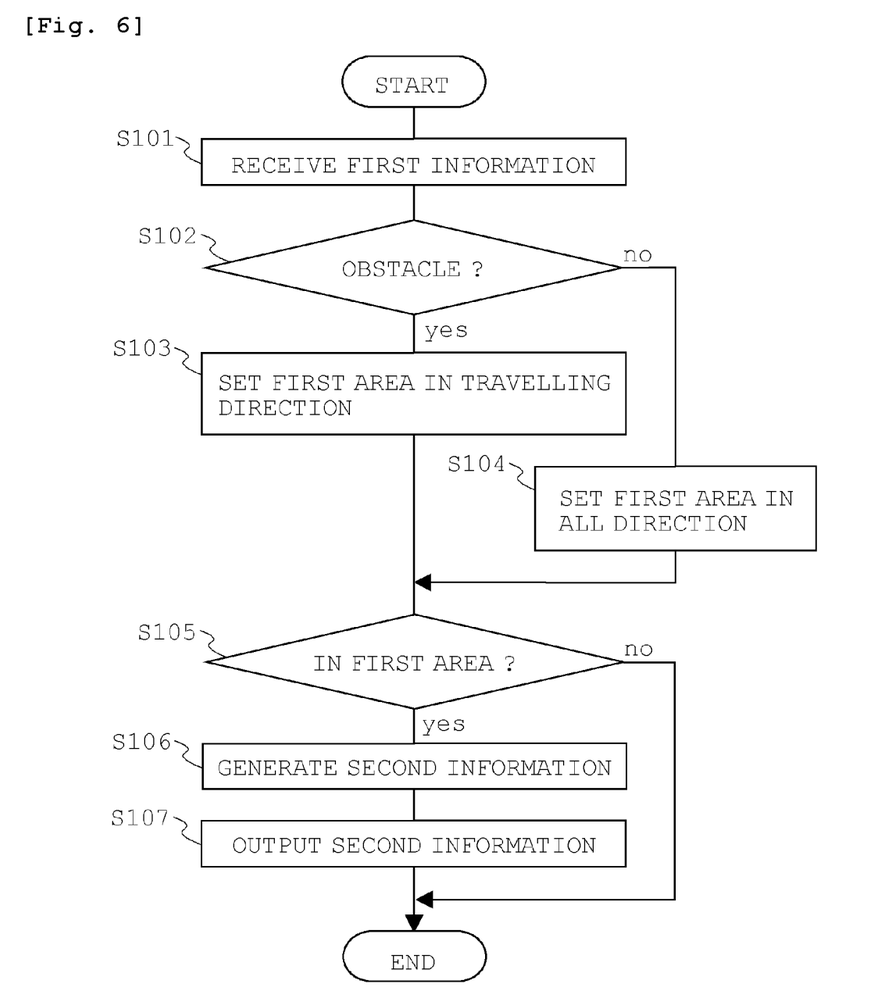
FIG. 6 is a flowchart illustrating a flow of processing executed by the on-vehicle apparatus according to the embodiment.

Next, the flow of processing executed by the on-vehicle apparatus 100 in the present embodiment will be described with reference to FIG. 6. FIG. 6 is a flowchart illustrating a processing routine executed by the on-vehicle apparatus 100 by triggering that the communicator 107 of the on-vehicle apparatus 100 receives the first information. The execution subject of the processing routine in FIG. 6 is the processor 101 of the on-vehicle apparatus 100. Here, the functional components (controller F110) of the on-vehicle apparatus 100 will be described as the execution subject.

In the processing routine of FIG. 6, when the communicator 107 of the on-vehicle apparatus 100 receives the first information, the first information is passed from the communicator 107 to the controller F110. As a result, the controller F110 receives the first information through the communicator 107 (step S101). When the process of step S101 is completed, the controller F110 executes the process of step S102.

In step S102, the controller F110 determines whether the type of the first object is an obstacle based on the information regarding the type of the first object included in the first information received in step S101. When the type of the first object is an obstacle (positive determination in step S102), the controller F110 executes the process in step S103. Further, when the type of the first object is an emergency vehicle, it is determined that the type of the first object is not an obstacle (negative determination in step S102), and the controller F110 executes the process in step S104.

In step S103, as described in the description of FIG. 4 above, the controller F110 sets a virtual area extending toward the traveling direction side of the first vehicle 10 as the first area. At that time, if the obstacle corresponds to the first obstacle, the first length D11 is set larger than when the obstacle corresponds to the second obstacle.

In step S104, as described in the description of FIG. 5 above, the controller F110 sets a virtual area extending in all directions from the first vehicle 10 in plan view (an area substantially circular in radius R11 centered on the first vehicle 10) as the first area.

When the processing of step S103 or step S104 is completed, the controller F110 executes the processing of step S105. In step S105, the controller F110 determines whether the first object is located in the first area set in step S103 or step S104 based on the position information of the first object included in the first information received in step S101. When it is determined that the first object is not located in the first area (negative determination in step S105), the controller F110 ends the execution of this processing routine without generating and outputting the second information. On the other hand, when it is determined that the first object is located in the first area (positive determination in step S105), the controller F110 executes the processes after step S106.

In step S106, the controller F110 generates the second information corresponding to the first object. As described above, the second information is the information for prompting the user of the first vehicle 10 to alert the first object, and includes the information suggesting a direction in which the first object is located, the information for prompting the user to prepare for a driving operation to avoid the first object, and the like.

The second information may include an information indicating the type of the first object. When the process of step S106 is completed, the controller F110 executes the process of step S107.

In step S107, the controller F110 outputs the second information generated in step S106 through the output device 104. At that time, for example, the controller F110 may display a character indicating the second information on the display of the output device 104, or may output an audio indicating the second information from the speaker of the output device 104. When the processing of step S107 is completed, the controller F110 ends the execution of this processing routine.

(Operation and Effects of System according to Embodiment)

In the embodiment described above, the on-vehicle apparatus 100 sets a range of the first area according to the type of the first object. Then, the on-vehicle apparatus 100 outputs the second information only for the first object located in the set first area. Accordingly, the user of the first vehicle 10 is alerted only to the first object for which there is a high need to alert the user of the first vehicle 10. As a result, it is possible to appropriately alert the user of the first vehicle 10 while reducing the troublesomeness of the user of the first vehicle 10.

<Others>

The above embodiment has been described only by way of example. The technology disclosed herein can be implemented in modified manners without departing from the essence of this disclosure. For example, the first object is not limited to an obstacle and an emergency vehicle, and may be a slip occurrence point.

One or some of the processes that have been described as processes performed by one apparatus may be performed by a plurality of apparatuses in a distributed manner. One or some of the processes that have been described as processes performed by different apparatuses may be performed by one apparatus. The hardware configuration used to implement various functions in a computer system may be modified flexibly.

What is claimed is:

1. An information processing apparatus mounted on a first vehicle that performs V2X (Vehicle-to-Everything) communication, comprising a controller including at least one processor, wherein the controller is configured to execute processing of:
receiving a first information including an information regarding a location and a type of a first object;
setting a plurality of areas corresponding to the first vehicle based on the information regarding the type of the first object, wherein:
setting a first area of the plurality of areas corresponding to the first vehicle when the information regarding the type of the first object is an obstacle, the first area of the plurality of areas being a substantially inverted triangular area having a base shape that is orthogonal to a traveling direction of the first vehicle,
setting a second area of the plurality of areas when the information regarding the type of the first object is an emergency vehicle, the second area of the plurality of areas extending in all directions from the first vehicle in a plan view; and
outputting a second information for prompting attention to the first object through an output device mounted on the first vehicle, when it is determined that the first object is located in the first area based on the information regarding the location of the first object or the second area based on the information regarding the location of the first object.

2. The information processing apparatus according to the claim 1, wherein the controller sets a range of the first area to be larger when the obstacle corresponds to a first obstacle than when the obstacle corresponds to a second obstacle.

3. The information processing apparatus according to the claim 1, wherein the length from the base shape of the substantially inverted triangular area in the traveling direction of the first vehicle to the first vehicle is a fixed value set in advance.

4. The information processing apparatus according to the claim 1, wherein the length from the base shape of the substantially inverted triangular area in the traveling direction of the first vehicle to the first vehicle is a variable value set to a longer value as a traveling speed of the first vehicle increases.

5. The information processing apparatus according to the claim 1, wherein the obstacle corresponds to an obstacle and surroundings of the obstacle requiring the first area to have a larger range from the first vehicle compared a range from the first vehicle of the second area.

6. The information processing apparatus according to the claim 1, wherein the first vehicle is positioned at a vertex of the substantially inverted triangular area in a plan view.

* * * * *